US010572939B1

(12) United States Patent
Bawadhankar et al.

(10) Patent No.: US 10,572,939 B1
(45) Date of Patent: Feb. 25, 2020

(54) API FRAMEWORK FOR CLEARING NON-DELIVERABLE INTEREST RATE SWAPS

(71) Applicant: Chicago Mercantile Exchange Inc., Chicago, IL (US)

(72) Inventors: Dhiraj Bawadhankar, Naperville, IL (US); Panagiotis Xythalis, Scotch Plains, NJ (US); Jingbin Yin, Naperville, IL (US); Molang Dong, Jersey City, NJ (US); Fateen Sharaby, Hoboken, NJ (US); Romil Parekh, Northbrook, IL (US); Jalpan Shah, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 524 days.

(21) Appl. No.: 15/250,498

(22) Filed: Aug. 29, 2016

Related U.S. Application Data

(60) Provisional application No. 62/211,473, filed on Aug. 28, 2015.

(51) Int. Cl.
  *G06Q 40/04* (2012.01)
  *G06Q 20/02* (2012.01)
  *G06Q 40/06* (2012.01)

(52) U.S. Cl.
  CPC .......... *G06Q 40/04* (2013.01); *G06Q 20/023* (2013.01); *G06Q 40/06* (2013.01)

(58) Field of Classification Search
  CPC .............................................. G06Q 40/04–06
  See application file for complete search history.

(56) References Cited

U.S. PATENT DOCUMENTS

| 8,255,313 | B2 * | 8/2012 | Kraus | G06Q 40/00 705/35 |
| 2005/0097029 | A1 * | 5/2005 | Cooper | G06Q 40/00 705/37 |

(Continued)

OTHER PUBLICATIONS

Varma, Jayanth R., "Two curves and non deliverable interest rate swaps", Prof. Jayanth R. Varma's Financial Markets Blog, Jul. 24, 2011. (Year: 2011).*

(Continued)

*Primary Examiner* — Eric T Wong
(74) *Attorney, Agent, or Firm* — Lempia Summerfield Katz LLC

(57) ABSTRACT

Systems and methods are provided for a clearing framework for clearing a non-deliverable interest rate swap. The clearing framework includes an application programming interface (API) including functions for processing trade messages including information used by a clearing house computing system in clearing non-deliverable interest rate swaps; one or more user interface screens comprising information corresponding to one or more non-deliverable interest rate swaps and one or more user interface screens comprising information of cleared interest rate swaps, one an API for reporting clearing information, wherein the one or more functions comprise a first messaging function to confirm clearing of the one or more non-deliverable interest rate swaps and a second messaging function to request consent to clear the one or more non-deliverable interest rate swaps.

9 Claims, 4 Drawing Sheets

(56) References Cited

U.S. PATENT DOCUMENTS

| | | | | |
|---|---|---|---|---|
| 2007/0083458 | A1* | 4/2007 | Rosenthal | G06Q 10/10 |
| | | | | 705/37 |
| 2007/0118459 | A1* | 5/2007 | Bauerschmidt | G06Q 40/00 |
| | | | | 705/37 |
| 2010/0185559 | A1* | 7/2010 | May | G06Q 30/08 |
| | | | | 705/36 R |
| 2012/0016784 | A1* | 1/2012 | Mintz | G06Q 40/04 |
| | | | | 705/37 |
| 2012/0254008 | A1* | 10/2012 | Brady | G06Q 40/04 |
| | | | | 705/37 |
| 2014/0236798 | A1* | 8/2014 | Feilbogen | G06Q 40/00 |
| | | | | 705/37 |
| 2014/0279364 | A1* | 9/2014 | Sandhu | G06Q 40/04 |
| | | | | 705/37 |
| 2015/0026028 | A1* | 1/2015 | Davies | G06Q 40/04 |
| | | | | 705/37 |

OTHER PUBLICATIONS

"Introducing AWS Lambda", Nov. 13, 2014. (Year: 2014).*
"Introducing Amazon API Gateway", Jul. 9, 2015. (Year: 2015).*
"Bloomberg Creates First NDF Clearing Link from FXGO to CME Group", Business Wire, Jul. 10, 2012. (Year: 2012).*

* cited by examiner

API FRAMEWORK FOR CLEARING NON-DELIVERABLE INTEREST RATE SWAPS

RELATED APPLICATIONS

This application claims priority to U.S. Provisional Patent Application No. 62/211,473 filed Aug. 28, 2015, which is incorporated by reference in its entirety herein.

FIELD OF THE INVENTION

Aspects of the invention relate to systems and methods for derivative clearing. More particularly, aspects of the invention relate to providing an application programming interface (API) framework and user interface screens for clearing non-deliverable interest rate swaps.

BACKGROUND

Exchanges are typically associated with clearing houses that are responsible for settling trading accounts, clearing trades, collecting, and maintaining performance bond funds, regulating delivery and reporting trading data. Clearing is the procedure through which the clearing house becomes buyer to each seller of a contract, and seller to each buyer, and assumes responsibility for protecting buyers and sellers from financial loss by assuring performance on each contract. This may be accomplished through the clearing process, whereby transactions are matched.

Clearing houses establish clearing level performance bonds (margins) for traded financial products and establishes minimum performance bond requirements for customers. A performance bond, also referred to as a margin, is the funds that may be required to be deposited by a customer with his or her broker, by a broker with a clearing member or by a clearing member with the clearing house, for the purpose of insuring the broker or clearing house against loss on open contracts. The performance bond is not a part payment on a purchase and helps to ensure the financial integrity of brokers, clearing members and exchanges or other trading entities as a whole. A performance bond to clearing house refers to the minimum dollar deposit which is required by the clearing house from clearing members in accordance with their positions. Maintenance, or maintenance margin, refers to a sum, usually smaller than the initial performance bond, which must remain on deposit in the customer's account for any position at all times. In order to minimize risk to an exchange or other trading entity while minimizing the burden on members, it is desirable to approximate the requisite performance bond or margin requirement as closely as possible to the actual risk of the account at any given time.

Risks and margin requirements can be difficult to determine for illiquid and concentrated positions. In many cases, non-deliverable interest rate swaps may not be cleared. For example, some existing clearing house computing systems may not be configured to perform clearing activities for products based on currencies that cannot move freely. In cases where interest rate swap products are non-deliverable, the clearing house computing system may be required to interface with remote computing systems located in the local jurisdiction of the non-deliverable currency to provide clearing of such non-deliverable interest rate swaps resulting in performance inefficiencies and/or added complexity into the clearing process. Accordingly, a need has been recognized for systems and methods to improve the operational efficiency of clearing house computing systems to more easily reduce risks associated with non-deliverable interest rate swaps.

SUMMARY OF THE INVENTION

Aspects of the invention overcomes at least some of the problems and limitations of the prior art by providing systems and methods for configuring a clearing house computing system to provide clearing for non-deliverable interest rate products. Systems and methods may include a clearing framework for clearing one or more non-deliverable interest rate swaps. The clearing framework includes an application programming interface (API) including functions for processing trade messages including information used by a clearing house computing system in clearing non-deliverable interest rate swaps; one or more user interface screens comprising information corresponding to one or more non-deliverable interest rate swaps and one or more user interface screens comprising information of cleared interest rate swaps, and an API for reporting clearing information, wherein the one or more functions comprise a messaging function to confirm clearing of the one or more non-deliverable interest rate swaps. The framework also contains functions for curve building, valuation, cashflow generation and reporting of valuation.

In other embodiments, the present invention can be partially or wholly implemented on a specially programmed computer-readable medium, for example, by storing computer-executable instructions or modules, or by utilizing computer-readable data structures for use by a special purpose computing system.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof wherein:

FIG. 3 shows an illustrative user interface screen corresponding to a position management system interface according to aspects of the present disclosure; and FIG. 4 shows an illustrative cash flow calculation using functions included the clearing network according to aspects of the present disclosure.

DETAILED DESCRIPTION

An interest rate swap is a type of over-the-counter (OTC) product in which parties agree to exchange streams of future interest payments based on a specified principal or notional amount. Each stream may be referred to as a leg. Swaps are often used to hedge certain risks, but they may also be used for speculative purposes.

An example of an interest rate swap includes a plain fixed-to-floating, or "vanilla," swap. A vanilla swap includes an exchange of an interest stream based on a floating rate and an interest stream based on a fixed rate. In a vanilla swap, a first party makes periodic interest payments to a second party based on the floating interest rate and receives interest payments from the second party based on the fixed interest rate. Conversely, the second party receives periodic interest payments from the first party based on the floating interest rate and makes interest payments to the first party based on the fixed interest rate. The fixed and floating rate payments are based on a common notional amount. Over the life of the swap, the floating rate may be periodically reset to a rate published by a known source of short-term interest rates. e.g., the London InterBank Offered Rate (LIBOR).

Streams of payments under a swap may extend well into the future (e.g., 10 years or more). Parties may accumulate large portfolios of swaps. As such, financial institutions, such as a financial exchange, a bank, an investment broker, etc. may face an increased need for data storage and/or computing capacity to manage one or more of these large portfolios of swaps. For various reasons, it would be desirable to condense multiple swaps in a portfolio into a single hypothetical swap that has characteristics similar to the portfolio swaps.

Figure 1:
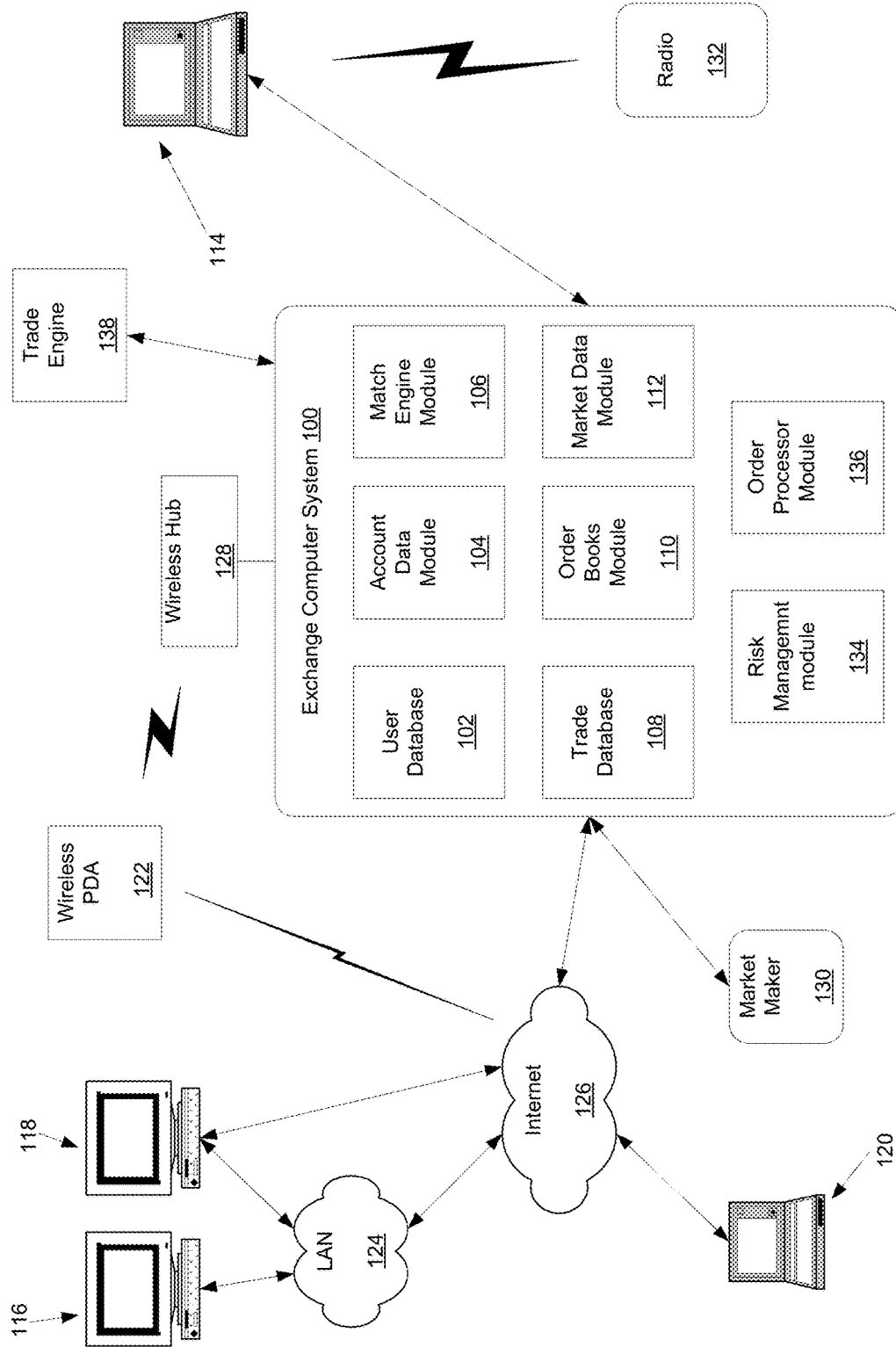
FIG. 1 shows a computer network system that may be used to implement aspects of the present disclosure.

Aspects of the present invention are preferably implemented with special purpose computer devices and computer networks that process exchange information and/or allow users to exchange trading information. An illustrative trading network environment for implementing trading systems and methods is shown in FIG. 1. An exchange computer system 100 is specifically programmed to perform one or more functions of a financial exchange. For example, the exchange computer system 100 may receive orders and transmit market data related to orders and trades to users. In some cases, the exchange computer system 100 may process financial exchange received from one or more external users and/or other computer systems external to the exchange computer system 100. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem. DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may' include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

ILLUSTRATIVE EMBODIMENTS

In at least some embodiments, a special purpose computing system, such as the exchange computer system 100 (or "computer system 100") may receive, store, generate, and/or otherwise process data in connection with clearing non-deliverable interest rate swaps. For convenience, the term "swap" is used herein as a shorthand reference to an interest rate swap. In some cases, non-deliverable interest rate swaps may not be cleared. A framework, such as the framework discussed herein, may be used clear non-deliverable interest rate swaps. In many cases, clearing of non-deliverable interest rate swaps may provide many benefits to the marketplace including but not limited to capital efficiencies, netting of margins, and other cash flows with existing cleared products, the guarantee that clearing waterfall provides, etc. In many cases, however, the benefits provided by the non-deliverable interest rate swaps may not account for offshore markets. Because currencies of these offshore markets cannot move freely, as they are non-deliverable, the clearing process used with these interest rate swap products may have to be modified and, in some cases, significantly modified. The clearing processes discussed herein may provide valuations of non-deliverable and/or netting of cash flows with deliverable currencies reducing a number of cash flows associated with a client portfolio. The systems and methods discussed herein may provide (1) a new valuation mechanism, (2) cash flows in deliverable currencies. (3) netting of cash flows, and/or (4) capturing risk. In some cases, the valuation mechanism may be discussed in terms of a framework that may be used for forecasting and/or discounting non deliverable currencies, such as the Brazilian Real (BRL), the Chilean Peso (CLP), the Chinese Renminbi (CNY), the Columbian Peso (COP), the Indonesian Rupiah (IDR), the Indian Rupee (INR), the Korean Won (KRW), the Malaysian Ringgit (MYR), the Peruvian Sol (PEN), the Philippine Peso (PHP), the Russian Ruble (RUB), the Taiwanese Dollar (TWD), and the like. This framework may also extend to calculation and/or movement of cash flows in deliverable currencies (e.g., the United States Dollar (USD), the European Union Euro (FUR), etc. While some illustrative examples may be discussed in terms of a particular deliverable currency (e.g., USD, etc.) and/or non deliverable currency (e.g., BRE, etc.) the framework may include functions to handle similar issues related to processing interest rate swaps with respect to a particular currency, and this disclosure is not limited to the specific illustrative examples discussed.

In some cases, the computing framework processed by the exchange computing system 100 may build and/or forecast one or more curves for a non-deliverable interest rate swap, such as a cleared offshore (e.g., BRE, etc.) interest rate swap that may be based on an average one-day interbank deposit (CDI) rate representative of an average rate of all inter-bank overnight transactions in the region local to the currency (e.g., Brazil, etc.). In some cases, the interest rate swap may comprise a specified product type, such as a zero coupon swap, which may be reflected in a product type field in a report, API function call, and/or an interface screen. Supported floating index and/or maturities may comprise a deliverable currency, such as the United States dollar (USD) and the like, a non-deliverable currency such as the BRL and the like and may comprise an index tenor having a maturity of a defined period (e.g., 10 years, etc.). In some cases, such a non-deliverable swap (e.g., a BRL IRS) may be traded, for example, by a wide variety of market participants to gain exposure to a particular country's currency and/or interbank deposit futures, (e.g., Brazil interbank deposit (DI) futures traded on BM&F Exchange, etc.). The swaps may be configured to imitate the structure of the onshore DI Futures contracts, such as by using a modified computing system to efficiently manage the currency differences without requiring a remote connection to a remote computing system located in country associated with the non-deliverable currency, removing communication and/or time problems associated with such an arrangement. All swaps have a fixed leg versus an interbank deposit based floating leg. There is a single coupon settled on the business day following the maturity date. In an illustrative example, BRL is a non-deliverable currency, and ally all cash flows associated with the BRL IRS may be settled in USD, or other such deliverable currency.

In some cases, the computing framework may comprise a non-deliverable interest rate swap (ND-IRS) clearing framework may include information defining a scope of the non-deliverable interest rate swap to be cleared. In an illustrative example, the framework may be configured for clearing products associated with a Brazilian Real/US dollar interest rate swap product, where all cash flows are settled in US dollars. The ND-IRS clearing framework may include a trade submission API that may be used to format trade messages received by the clearing house computing system. For example, the API may include a data structure defining future value notional details and/or settlement provisions associated with each ND-IRS. The framework may further provide one or more user interface screens for presenting and/or to facilitate clearing of non-deliverable interest rate swap products. In an illustrative example, the one or more user interface screens may provide information about one or more transfers that may be initiated based on a future value notional. Such future value notional amounts may be presented to a user on the user interface screens, for example, in a screen showing trades corresponding to one or more search terms. This user interface screen may further include an expanded view of one or more listed non-deliverable interest rate swaps, where the expanded view may include one or more of a start date, an end date, a coupon date, a fixing date, an FX fixing date, a notional amount, a forward rate, a discount factor, a projected amount and a present value amount. In some cases, the swap may be supported for a defined duration (e.g., a time period up to the maturity of the IRS, such as 10 years, 20 years, etc.). In some cases, a buffer may be associated with a maximum maturity variable that may be used to compensate for a number of factors including forward starling swaps, day counts, holidays, and the like. A formula may be used to calculate the maximum maturity, an example of which may be MM=(365.25*10)+10, such that a maximum number of days, rounded up to the nearest day, may be calculated to be 3,663 days.

In some cases, an index may be referenced to monitor a daily average rate of the non-deliverable currency (e.g., BRL), where the index may be calculated and/or published daily. In some cases, the publication of the rate on a reset date may occur at a time associated with a next business day in the country of the non-deliverable currency (e.g., 12:00 PM). In some cases, any adjustment to the rate made after the end of the business day may not be incorporated. In some cases, the API may include a messaging format that may be used for communicating information between computing systems, such as a financial products markup language (FpML) message format, a financial information exchange (FIX) markup language (FIXML) message format, and/or the like. In some cases, one or more holiday calendars may be used, such as a US holiday calendar, a Brazil holiday calendar, or other calendar associated with a country corresponding to a deliverable currency or a non-deliverable currency. Based on this calendar, a day count conversion parameter may be used (e.g., business day/252, etc.) such that the number of business days from and including the effective date up to and excluding the maturity date may be accounted for. A future value notional (FVN) parameter may be used in cleared confirmation messages and/or trade registers associated with the API, where FVN may be equal to an initial notional $(INx)*(1+r)^{Bus\ 252}$, where BUS is a number of business days from and including the effective date up to and excluding the maturity date and where r is a fixed rate associated with the swap. In some cases a swap (e.g., a BRL IRS, etc.) may be held in a standard over the counter (OTC) position account, so that such swaps may be managed more efficiently. Allocations may be based on the future value notional.

In some cases, the API may include a trade submission API which may include messaging formats configured to manage future value notional details, such that a trade submission message may contain FVN details in a FIXML portion of a trade message. An illustration of such a message is provided below, where a type variable (e.g., PMT="2") may be used to identify the future value notional, a business day variable (e.g., $A_{Days}$) may be used to identify the number of business days used in the future value notional calculation, a future notional value variable (e.g., FutValNotl) may be used to communicate the future value notional amount in BRL, and a termination date variable (e.g., FutValDt) may be used to identify the termination date of the swap. An illustrative message may include a FIXML, or other messaging format portion, that may identify the FVN, such as the following:

```
<SecXML>
<!-Stream Typ ="0"- Payment Stream -->
<Strm Typ= "0">
    <!-Typ= 2 - Single Payment AccrlDays - The number of data from the
    adjusted calculation period start date to the adjusted value date,
    calculated in accordance with the applicable day count fraction.
        FutValDt = The adjusted value date of the future value amount. -->
    <PmtStrm Typ="2"AcrlDays="122">
        <Fixed FutValNotl="10467296.79" FutValDt="2015-07-01"/>
    </PmtStrm>
</Strm>
</Instrmt>
<RptSide Side="1"ClOrdID="BRL-TEST-2223334245541" InptSrc=
"TWB"RefRiskLmtChkID="123456"
RiskChkStat="13">
    <Pty ID=A-61879" R="24" Src="D"/>
    <TrdRegTS Typ="1" TS="2014-09-13T14:38:17.384Z"/>
</RptSide>
<RptSide Side="2" ClOrdID="BRL-TEST-22223334-3" inptSrc=
"TWB" RefRiskLimitChkID="67890"
RiskChktat="13">
    <Pty ID=A-61880"R="24"Src="D"/>
    <TrdRegTS Typ="1" TS="2014-09-13T14:38:17.384Z"/>
</RptSide>
</TrdCaptRpt>
</FIXML>
```

In some cases, a messaging element (e.g., an FpML element) may be included in a messaging format at a particular portion of the message corresponding to a swap format. For example, an FpML element may be included at a leg-level of each swap, where a settlement provision variable may be used to identify information to identify the FX fixing applied to convert the BRE payment to USD and may contain information associated with the settlement currency, FX rate source, holiday adjustments, and the like. A settlement currency variable may be used to identify the currency the coupon payment will be settled, a settlement rate option may be used to identify the FX rate source to be used in the conversion, and another variable may be used to identify a date relative to calculation period dates that may be used to identify the fixing offset is relative to this date. The settlement provision may be represented in a number of ways, such as a fixing schedule messaging format:

```
<settlementProvision>
|   <settlementCurrency>USD</settlementCurrency>
|   <nonDeliverableSettlement>
|   |   <referenceCurrency>BRL</referenceCurrency>
|   |   <fxFixingSchedule>
|   |   |   <unadjustedDate>2015-06-30</unadjustedDate>
|   |   |   <dateAdjustments>
|   |   |   |   <businessDayConvention>PRECEDING
|   |   |   |   </businessDayConvention>
|   |   |   |   <businessCenters>
|   |   |   |   |   <businessCenter>BRBD</businessCenter>
|   |   |   |   |   <businessCenter>USNY </businessCenter>
|   |   |   |   </businessCenters>
|   |   |   </dateAdjustments>
|   |   </fxFixingSchedule>
|   |   <settlementRateOption>BRL PTAX/BRL09
|   |   </settlementRateOption>
|   </nonDeliverableSettlement>
</settlementProvision>
``` or a fixing date format:

```
<settlementProvision>
|   <settlementCurrency>USD</settlementCurrency>
|   <nonDeliverableSettlement>
|   |   <referenceCurrency>BRL</referenceCurrency>
|   |   <fxFixingDate>
|   |   |   <periodMultiplier>-1</periodMultiplier>
|   |   |   <period>D</period>
|   |   |   <dayType>Business</dayType>
|   |   |   <businessDayConvention>PRECEDING
|   |   |   </businessDayConvention>
|   |   |   <businessCenters>
|   |   |   |   <businessCenter>USNY</businessCenter>
|   |   |   |   <businessCenter>BRBD</businessCenter>
|   |   |   </businessCenters>
|   |   |   <dateRelativeToCalculationPeriodDates>
|   |   |   |   <calculationPeriodDatesReference href=
|   |   |   |   "floatingLegTerminationDate"/>
|   |   |   </dateRelativeToCalculationPeriodDates>
|   |   </fxFixingDate>
|   |   <settlementRateOption>BRL.PTAX/BRL09
|   |   </settlementRateOption>
|   </nonDeliverableSettlement>
</settlementProvision>
```

Figure 3:
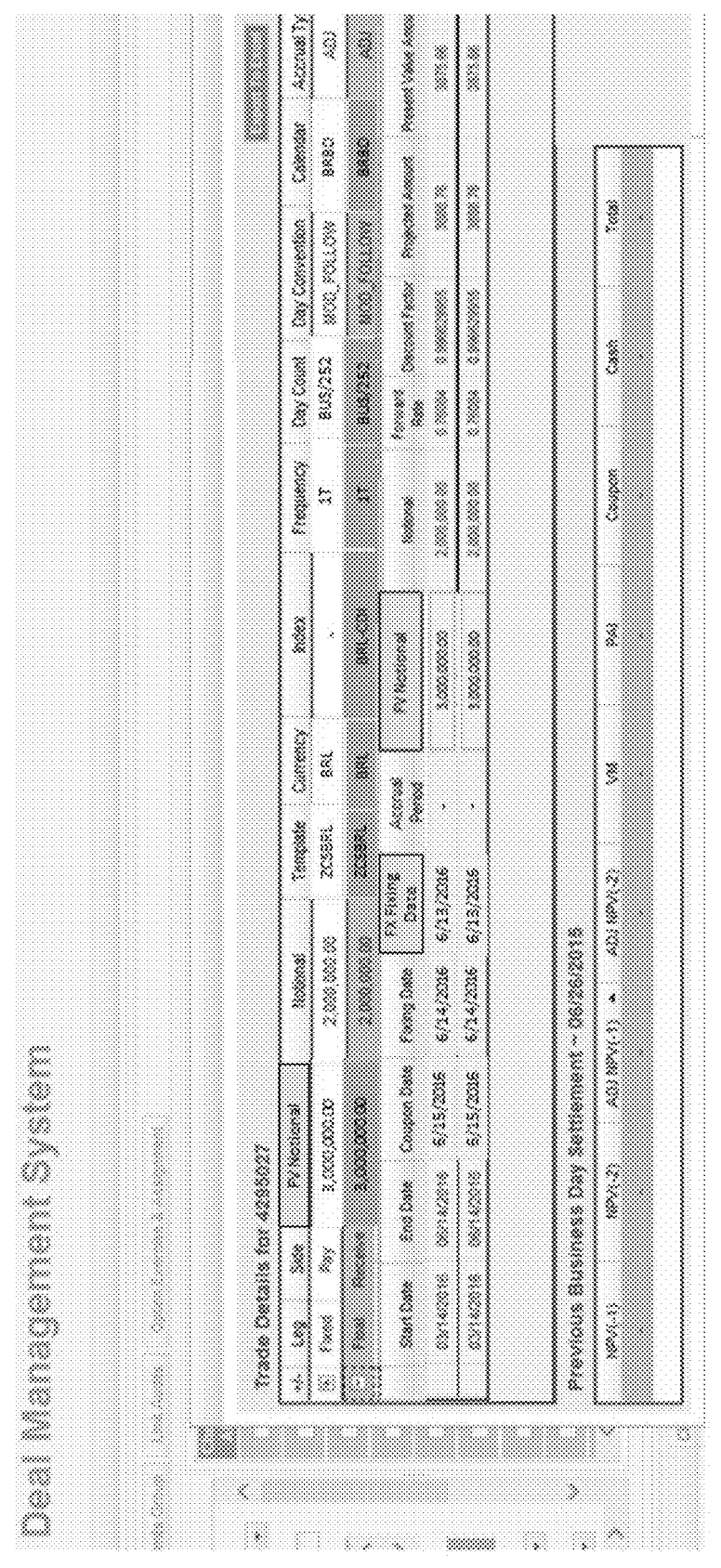

A position management system may be used to handle transfers initiated based on the future value notional of a swap, where the FVN may be displayed in search results. In some cases, the FX fixing date may be displayed in a pop-up window (e.g., a new popup window, an existing popup window, etc.) that may appear when a link is selected. The FX fixing date may appear when a leg is expanded, as shown in FIG. 3.

An implied BRL OIS curve may be built to reflect the funding cost faced by offshore US investors. The forecast curve may be built with reference to futures adjusted by an on-and-offshore spread. To reflect the USD funding cost, USD/BRL non-deliverable FX spot and forwards may be used to translate the USD OIS curve into the BRL, equivalent for discounting. For the forecast curve, onshore futures and on-and-offshore spreads may be used to reflect the actual offshore BRL interest rates. Valuation curve inputs may be defined for both a forecasting curve API function and a discounting curve API function. For example, with respect to forecasting input curve inputs, since DI futures are single cash flow instruments, BRL forecast curves may be built the same with or without the discount curve. A difference may occur when pricing a BRL offshore trade with single or dual curves. An illustrative input may include a single day CDI index variable, a front four-month DI future variable, and a number (e.g., 30.40, 50, etc.) of quarterly DI future contract inputs. For a discounting curve, USD/BRL non-deliverable FX forwards may be used for the calculation of the BRL discount curve and the USD Federal funds curve may be used as an input. For example, inputs may include a O/N FX rate, a T/N FX rate, a spot FX rate, and one or more inputs corresponding to FX forwards of differing tenors, such as 1 week, 1 month, 2 month, 3 month, 6 month, 9 month, 1-5 year, 7 year, 10 year and the like.

A margin model may be used to allow a BRL IRS to follow an existing margin model, to improve the efficiency of the processing, such as by following an OTC IRS historical value at risk (HVAR) 5-day margin model, where the BRL. IRS may be portfolio margined with similar OTC IRS and/or other eligible futures products.

Curves may be built using one or more methodologies. For example, a clearinghouse may use a bootstrap generator for BRL forecast curve to ensure all DI future inputs may be priced at par. In the curve generation process, due to concerns regarding compounding, a log linear interpolator on discount factor may be selected. For the discount curve, global generator and log spline interpolator on discount factor may be used to ensure both par-pricing and curve smoothness.

For settlement purposes, the API may be configured to settle all BRL IRS cash flows in the deliverable currency (e.g., USD), where cash flow may include a number of components such as coupon payments, upfront fees, variation margin, PAI, and the like. In some cases, coupon payments may be paid at a specified time, such as at the maturity of the swap. Coupons paid at maturity may be represented by a "1T" payment frequency on all clearing member reports and real-time messages. Coupon payment dates may be be adjusted from the maturity date using the payment day offset (1D). En some cases, a number of business days from the maturity date when the payment may be settled may be defined as a payment day offset parameter, such that an FpML confirmation message may be used to communicate such information. In some cases, a standard payment day offset for the undeliverable currency may be 1 day. An example confirmation message may be formatted as:

<paymentDaysOffset>
<periodMultiplier>1</periodMultiplier>
<period>D</period>
<dayType>Business</dayType>
</paymentDaysOffset>

In some cases, the computing framework may provide a component configured to build an implied OIS curve to reflect the funding cost faced by offshore US investors in the non-deliverable currency BRL). For example, the forecast curve may be built with BM&F DI futures adjusted by an on-and-offshore spread. In this illustrative example to reflect the USD funding cost, USD/BRL non-deliverable FX spot and forwards may be used to translate the USD OIS curve into a BRL equivalent for discounting. In such cases, the forecast curve, onshore BM&F DI futures and on-and-offshore spreads may be used to reflect the actual offshore BRL interest rates. In some cases, the clearing computing system may be configured to use an OTC IRS historical value at risk (HVAR) 5-day margin model when computing margins during the clearing process. In such cases, a ND-IRS may be margined in a portfolio with all OTC IRS and eligible futures products.

In some cases, calculation of floating rate coupons may be calculated using a formula included in the API. For example.

$$\text{Notional} \times \prod_{i=0}^{n-1} (1 + DI_i)^{1/252}$$

where $DI_i$ is the overnight CDI rate and n is the number of business days. In some cases, a fixed coupon payment on IRSTR may reflect a float interest amount. Similarly, calculations of fixed rate coupons may be calculated similarly:

$$\text{Notional} \times \prod_{i=0}^{n-1} (1 + r)^{1/252}$$

where r is the fixed rate and n is the number of business days. In some cases, this may be expressed as fixed coupon—FV notional—PV (initial) notional.

In some cases, the FX rate may be sued to convert non-deliverable currency coupon payments to the deliverable currency by using an ask price as reported via a reporting agency at a specified time of day (with respect to a time zone associated with the country of the non-deliverable currency) on a particular date. Further, variation margin and PAI may be settled on the following business day using a defined overnight FX rate, where $VM=$(Adjusted $NPV_{today}/FX_T$)$-$(Adjusted $NPV_{previous\ day}/FX_{T-1}$)

$VM=(BRL\ 4.000.000/3.1)-(BRL\ 4.300.000/3.2)$
$=\$53.427.4\ USD$

In some cases, upfront fees may be accepted in the deliverable currency, where fees may be settled any business day after the cleared date (e.g. cleared date+1, etc.) to the adjusted maturity date. A standard calendar (e.g., US, New York) may be used for all upfront fees. For discounting purposes, the fee must be converted to the non-deliverable currency using a defined formula (e.g., USD fee*$FX_T$). Price alignment interest (PAI) may be defined in the API as a particular rate (e.g., a federal funds rate). This rate may be the same as, or different than, other USD-denominated IRS. The undeliverable currency (e.g., BRL) may use the same PAI calculation as used for other IRS, where the result may be converted to USD> For example.

$PAI=(-$Adjusted $NPV_{previous\ day}/FX_{T-1})$*Latest Fed Funds rate*(Days/360)

where days corresponds to the number of days from the current day to the next business day in the USNY calendar.

In some cases, holiday calendars for both countries associated with the non-deliverable currency and the deliverable currency may be defined as data structures in the API. For example, reset and rate fixing calendars may include a Brazil Business Day Calendar (BRBD) as the required Reset and Fixing calendar. All other calendars may be added as optional. A payment calendar data structure and/or a FX fixing calendar data structure may include a Brazil Business Day Calendar (BRBD) and a New York (USNY) calendars as required Payment Calendars. All other calendars may be added as optional. In cases of unscheduled holidays not included in the noted data structures, the fixed and floating accrual periods may be affected differently. For example, fixed leg accrual periods may not be affected, an unscheduled holiday may remove one day from the floating leg's accrual period.

An overnight FX rate may be sued to convert variation margin and/or PAI from the undeliverable currency to the deliverable currency, based on the following:

$FX_T$=CME FX Rate $FX_1$=Tom Next Adjustment $FX_5$=Overnight Adjustment $FX_T = 1(1/WMR$ spot FX rate$-(FX_1/10,000)-(FX_0/10,000))$ $FX_T=1/(1/3.1485-(-3.47/10,000)-(-1.16/10,000))$
=3.1439

In some cases, the API may include one or more parameters that may be used for netting functionality. In addition to the economic attributes supported in the netting cycle today, the one, several or all attributes must match for BRL IRS to be eligible to net together including settlement currency, calculation period number of days, FX fixing date, FX fixing offset. FX fixing business day convention. FX fixing calendar, and the like. In some cases, the swap may be processed in an end-of-day netting cycle, where the swap may be eligible for full or partial netting.

In some cases, the API framework may include a reporting engine for use in generating one or more reporting outputs, such as a reporting user interface screen. In some cases, a trade register user interface screen may be modified to include additional fields to support future value notional, FX conversion, and/or other fields. One or more attributes to be displayed on the user interface screen may include:

interest for each leg of the swap, accrued next interest for each leg of the swap, notional, current notional for each leg, FV notional and the like.

In some cases, a cash flow advisory report may be generated with respect to reporting coupon and upfront fee payments, in the settlement currency. In some cases, the API may generate a user interface screen, a stored report file (e.g., a spreadsheet file, a text file, etc.). In some cases, the API may be used to generate a PAI report, as a file and/or a user interface screen, such that a federal funds rate (e.g., a swap PAI rate) may be added to daily reports. The API may be used to generate a rate reset report, as a file and/or a user interface screen. In some cases, one or more reports may be generated as an XML file, or similar. For example, a rate reset report may look like:

```
<cme index>
  <floatingRateIndex>BRL-CDI</floatingRateIndex>
  <indexTenor>
    <periodMultiplier>1</periodMultiplier>
    <period>D</period>
  </indexTenor>
<cme.index>
<cme rateObservation>
  <resetDate>2015-05-29</resetDate>
  <adjustedFixingDate>2015-05-29</adjustedFixingDate>
  <observedRate>0.1313</observedRate>
</cme:rateObservation>
</cme:reset>
```

In some cases, the API may generate one or more curve files for use in managing the swaps. Such curves may be available as files, or user interface screens. For example, a curve file may contain BRL-CDI curve points. In some cases, a base curve file may be modified such that rows may be added to assist in one or more calculations, such as initial margin replication. The API may further generate one or more other reports, such as holiday calendar reports, discount factor reports, and the like.

In some cases, the API interface for use by a clearing firm may include a settlement provision, where this new FpML element may be included at the leg-level of one or more

| | |
|---|---|
| FX_RATE | FX rate used to convert Variation Margin and PAI |
| PREVIOUS_FX_RATE | Previous day's FX rate used to convert Variation Margin and PAI |
| SETTLE_CCY | Currency of all cash flows settling on the trade. This field shall be populated fifr ALL trades. not only BRL. |
| FX_NOTIONAL | Value of notional at the maturity date |
| FX_FIXING_DATE | Date the FX Fixing rate is determined |
| FX_FIXING_RATE | Spot FX rate used to FX the non-deliverable coupon amount |
| FX_FIXING_DATE_OFFSET | Number of days to count back for the fixing date |
| FIX_FIXING_DAY_TYPE | Business or calendar |
| FX_FIXING_DATE_BUS_DAY_CONV | Applies the offset using business or calendar days |
| FX_FIXING_DATE_CAL | Calendar adjustment for the Fixing Offset |

In some cases, the trade register may display one or more columns corresponding to cash flow amounts in the deliverable currency, such as variation, PAI, upfront payment, fix coupon payment, float coupon payment, net cash flow, fee amount, PV fees, and the like. In some cases, the trade register user interface screen may display NPV, notional and accrual columns in the undeliverable currency, including NPV, previous NPV, previous NPV adjusted, leg 1 NPV, leg 2 NPV, accrued fixed coupon, accrued float coupon, accrued swap messages, such as a clearing confirmed message and a request consent messages. A settlement provision block may contain the information to identify the FX fixing applied to convert the BRL payment to USD and may contain the Settlement Currency, FX rate source, and holiday adjustments. A settlement Currency block may reflect the currency the coupon payment will settle in, a settlement rate option block may reflect the FX rate source to be used in the conversion, a date relative to calculation period dates block may reflect the fixing offset is relative to this date. The settlement provision can be represented in two ways:
(1) a fixing schedule format:

```
<settlementProvision>
|   <settlementCurrency>USD</settlementCurrency>
|   <nonDeliverableSettlement>
|   |   <referenceCurrency>BRL</referenceCurrency>
|   |   <fxFixingSchedule>
|   |   |   <unadjustedDate>2015-06-30</unadjustedDate>
|   |   |   <dateAdjustments>
|   |   |   |   <businessDayConvention>PRECEDING
|   |   |   |   </businessDayConvention>
|   |   |   |   <businessCenters>
|   |   |   |   |   <businessCenter>BRBD</businessCenter>
|   |   |   |   |   <businessCenter>USNY</businessCenter>
|   |   |   |   </businessCenters>
|   |   |   </dateAdjustments>
|   |   </fxFixingSchedule>
|   |   <settlementRateOption>BRL.PTAX/BRL09
|   |   </settlementRateOption>
|   </nonDeliverableSettlement>
</settlementProvision>
``` or a fixing date format:

```
<settlementProvision>
  <settlementCurrency>USD</settlementCurrency>
  <nonDeliverableSettlement>
    <referenceCurrency>BRL</referenceCurrency>
    <fxFixingDate>
      <periodMultiplier>-1</periodMultiplier>
      <period>D</period>
      <dayType>Business</dayType>
      <businessDayConvention>PRECEDING</businessDayConvention>
      <businessCenters>
        <businessCenter>USNY</businessCenter>
        <businessCenter>BRBD</businessCenter>
      </businessCenters>
      <dateRelativeToCalculationPeriodDates>
        <calculationPeriodDatesReference href =
        "floatingLegTerminationDate"/>
      </dateRelativeToCalculationPeriodDates>
    </fxFixingDate>
    <settlementRateOption>BRL.PTAX/BRL09</settlementRateOption>
  </nonDeliverableSettlement>
</settlementProvision>
```

Future value notional may be include in clearing firm confirmation and request consent messages with respect to the fixed leg only and may include:
   <futureValueNotional>
   <currency>BRL</currency>
   <amount>10467296 79</amount>
   <!--number of Brazil business days between adjusted effective & termination dates-->
   <calculationPeriodNumberOfDays>122</calculationPeriodNumberOfDays>
   <valueDate>2015-07-01</valueDate>
   </futureValueNotional>

Cash flows may be included in the cleared confirmation and request consent message formats and may contain all payment periods of the swap. Notional values listed in both fixed and floating leg cash flow blocks may be the initial notional, an example of which follows:

```
<cashflows>
   <cashflowsMatchParameters>true</cashflowsMatchParameters>
   <paymentCalculationPeriod>
      <adjustedPaymentDate>2015-07-02</adjustedPayment Date>
      <calculationPeriod>
         <adjustedStartDate>2015-05-20</adjustedStartDate>
         <adjustedEndDate>2015-07-01 </adjustedEndDate>
         <notionalAmount>9856218.36</notionalAmount>
         <fixedRate>2015-05-20</fixedRate>
      </calculationPeriod>
   </paymentCalculationPeriod>
</cashflows>
```

Figure 4:
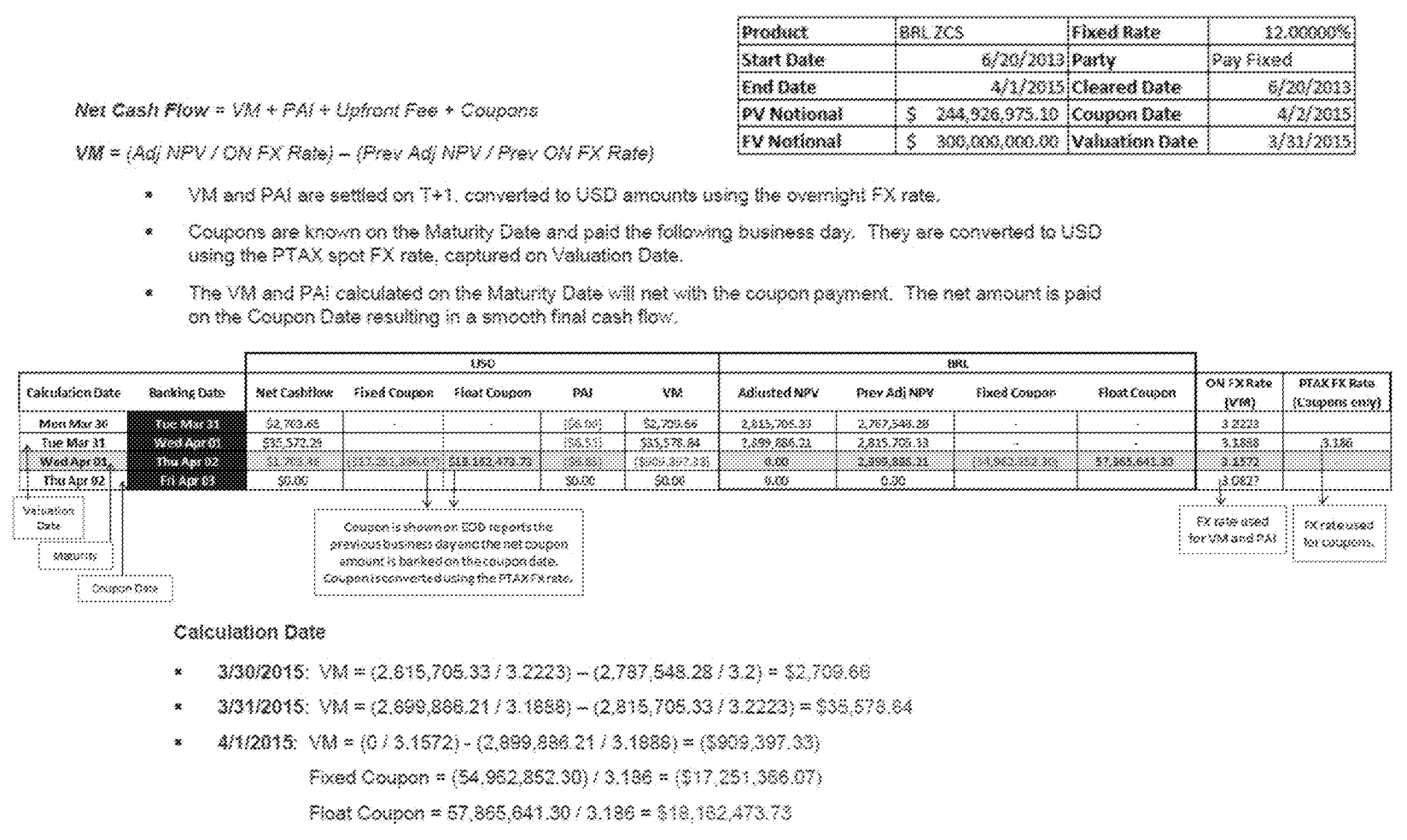

In some cases, the API may include functions for calculating one or more fees, including transfer fees. Based on the above noted interface, the API may support calculation and display of cash flow associated with the swap, as shown in the illustrative example of FIG. 4.

In some cases, the API may include one or more back loading templates, where non-deliverable currency fields may be added to a portion of a user interface (e.g., a swap tab of a back loading template). In some cases, the backloading template may include certain default values based on a selected input. For example, if the non-deliverable currency is BRL, then a settlement currency may be defined to be USD or another deliverable currency, a calculation period number of days (e.g. accrual days) may equal a number of days (Brazil) from the effective date to an adjusted FX fixing date. A FX fixing rate may correspond to a BRL computed rate, where a payment offset date may be defined as a predetermined number of days (e.g., 1 day), and a payment day time may be defined as a business day, a week day, or any day. One or more new fields may be included, such as:

| | | | | |
|---|---|---|---|---|
| PLATFORM_SIDE_ID | Platform assigned ID to the cleared side of the trade | Optional | VARCHAR(255) | 987654-1 |
| FV_NOTIONAL | Future Value Notional amount of the trade | Required if LEG1_OCY = BRL | FLOAT | |
| FX_FIXING_DATE | Date of FX fixing | Optional | Date | |
| FX_FIXING_DATE_OFFSET | Offset used to determine the FX fixing date | Optional | VARCHAR(10) | |
| FX_FIXING_DAY_TYPE | The type of days to use to find the FX fixing date | Optional | VARCHAR(32) | Business Calendar |
| FX_FIXING_DATE_BUS_DAY_CONV | Adjustment to use for FX fixing date | Optional | VARCHAR(32) | NONE FOLLOWING MODFOLLOWING PRECEDING MODPRECEDING |
| FX_FIXING_DATE_CAL | Calendars to use when adjusting the FX fixing date | Optional | VARCHAR(32) | BRBD,USNY |

In an example, net cash flow for one or more ND-IRS may be calculated as:

Net Cash Flow=$VM+PAI$+Upfront fees+Coupons, where $VM$=(Adj $NPV$/ON $FX$ Rate)−Prev $ADJ NPV$/Prev ON $FX$ Rate), where VM and PAI are settled on T+1 and converted to the deliverable currency (e.g., USD) amounts using the overnight FX rate. Further, coupons are known on the maturity date and paid the following business day. These coupons are converted to the deliverable currency (e.g., USD) using the PTAX spot FX rate, that was captured on the Valuation Date. Further, the VM and PAI calculated on the Maturity Date will net with the coupon payment. The net amount is paid on the Coupon Date resulting in a smooth final cash flow.

The framework may further be configured store and use one or more additional attributes when determining a net value. For example, in addition to the economic attributes supported in the netting cycle in current processes, one or more additional attributes must match for the ND-IRS to be eligible to be netted together. For example, a netting module incorporated in the framework may include one or more other parameters to examine during the netting process, including a settlement currency (e.g., USD), a calculation period number of days parameter, FX fixing date, FX fixing offset, FX fixing business day convention, FX fixing calendar and the like. The ND-IRS netting process may be initiated in a standard end-of-day netting cycle, or other netting cycle that may be received as an input by a user, defined as a process variable, or the like.

In some cases, the clearing house computing system may be configured to process at least one of the OIS curve and the discount curve to create a valuation model for use in computing a value of the swap. This valuation model may be used to calculate a price alignment between cleared and un-cleared swaps based on at least the overnight rate in the deliverable currency. In some cases, the valuation model may be used to generate values in both the deliverable and the non-deliverable currency. This deliverable currency value may be netted with other deliverable currency amounts when combined with other financial products associated with the deliverable currency.

In some cases, the framework may include one or more configurable fields and/or columns to display information concerning the ND-IRS clearing process, including one or more fields such as a current FX rate, a previous day's FX rate, a settlement currency of the cash flows, a notional amount at settlement, a FX fixing rate date, a spot FX rate used at Fixing, a FX fixing date offset to account for a number of days to count back to the fixing date, a fixing day type (e.g., a business day or a calendar day), an offset calendar type, and a calendar adjustment parameter for applying the fixing offset. The user interface may also include one or more columns to display the clearing information, where cash flow amounts may be displayed in the settlement currency (e.g., USD). For example, the columns may include variation, PAI, an upfront payment, a fixed coupon payment, a float coupon payment, a net cash flow, a fee amount, PV fees, and the like. In some cases, the user interface screen defining a trade register may display NPV notional and accrual columns in the non-deliverable currency (e.g., BRL). The trade register may include a column to display one or more of NPV, previous NPV, adjusted NPV, previous adjusted NPV, leg 1 NPV, leg 2 NPV, accrued fixed coupon, accrued float coupon, leg 1 accrued interest, leg 2 accrued interest, leg 1 next accrued interest, leg 2 next accrued interest, notional, leg 1 current notional, leg 2 current notional, FV notional, and the like. In some cases, the framework may include a report module that may be configured to provide a report that may include ND-IRS coupon and upfront fee payments as amounts in the deliverable currency (e.g., USD).

In some cases, the framework may provide an API for use in communication with a clearing firm computer system and/or a clearing module. For example, this clearing API may be configured to include a settlement provision element at a leg-level of each ND-IRS swap in both a clearing confirmation message and a request consent for clearing message. A settlement provision may include information to identify the FX fixing applied to convert the non-deliverable currency payment to the deliverable currency and may contain a settlement currency, an FX rate source, and holiday adjustments, if any. In some cases, the clearing API may include a future value notional amount that may be included in clearing firm confirmation and request consent messages in relation to only the fixed leg of the ND-IRS. In some cases, the clearing firm confirmation message and the request consent messages may contain all payment periods of the swap, where the notional listed in both fixed and floating leg cash flow will be shown to be the initial notional of the ND-IRS.

The framework may further include a backloading template that may include one or more fields associated with the non-deliverable currency. For example, if the non-deliverable currency in the first leg of an ND-IRS is BRL, then a default data structure may be provided and may include settlement currency defined to be USD, a calculation period=the number of Brazilian business days from an effective date to the adjusted FX fixing In some cases, discount and forecast curves may be generated for the illustrative swap, such as the aforementioned cleared offshore Brazilian Real (BRL) CDI Swap. An implied BRL OIS curve may be built to reflect the funding cost faced by offshore US investors. The forecast curve is built with BM&F DI futures adjusted by an on-and-offshore spread. To reflect the USD funding cost. USD/BRL non-deliverable FX spot and forwards are used to translate the USD OIS curve into the BRL equivalent for discounting. For the forecast curve, onshore BM&F DI futures and on-and-offshore spreads are used to reflect the actual offshore BRL interest rates.

The DI future is the one-day interbank deposit futures contract traded on BM&F exchange. It is effectively a fixed maturity date zero coupon OIS and regarded as the most liquid interest rate instrument of the Brazilian onshore market. The underlying CDI rate is the average one day interbank deposit rate, calculated by CETIP and expressed as a percentage rate per annum compounded daily based on a 252-day year. For the short term, BM&F lists monthly contracts. This progresses to quarterly and semi-annual contracts in the medium-term, and annual contracts on the long end. On a daily basis, the settlement prices of DI futures, calculated or arbitrated by BM&F, are used in the curve building. The next formula shows the relationship between the traded future price and DI rate.

$$P_i = \frac{100{,}000}{\left(1 + \frac{DI_i^{on}}{100}\right)^{\frac{BU_i}{252}}}$$

$P_1$ corresponds to the traded price of the ith future, $Di^{on}$ corresponds to a traded interest rate, $BU_1$ corresponds to a number of reserves between the trade a date and the day preceding the expiration date of the ith future, and 100,000 is a fixed value of the future notional Because of the IOF entry tax applied on foreign portfolios, DI futures are traded differently between onshore and offshore markets. That difference is referred to as the DI on-and-offshore spread. The spread will be applied on the onshore DI future rate to obtain the offshore Brazilian interest rate, as the next formula indicates.

$$DI_1^{off} - DI_1^{on} - Spread_1$$

Since only a limited number of spreads are quoted for the most liquid DI futures (usually January contracts), linear interpolation is used to calculate spreads for the unquoted contract months.

$$Spread_p = \frac{BU_2 - BU_p}{BU_2 - BU_1} * Spread_1 + \frac{BU_p - BU_1}{BU_2 - BU_1} * Spread_2$$

where $spread_p$ corresponds to an interpolated spread, $BU_1$, $BU_p$, and $BU_2$ correspond to a number of DI futures reserve, and spreads and spread-correspond to a quoted on and offshore spread.

The offshore non-deliverable FX forward outright rate is calculated as the interest rate differential between Brazilian Real and US Dollar, using interest rate parity:

$$X(t; T_i) - S * \frac{P_d^S(t; T_i)}{P_d^R(t; T_i)}$$

Where, $X(t; T_1)$ is the FX forward outright of tenor $T_1$; S is the FX spot rate; $P_d^S(T_1)$ is the Ied Funds discount factor, assumed to be risk-free; $P_d^R(t;T_1)$ is the implied BRL OIS discount factor.

Leveraging formula (1.4); $P_d^R(t;T_t)$ is derived below:

$$P_d^R(t; T_i) = \frac{S}{X(t; T_i)} * P_d^S(t; T_i)$$

In some cases, a BRL discount curve, as discussed above, may be generated based on the above formula, where USD/BRL non-deliverable FX forwards are used for the calculation of the BRL discount curve and the USD Fed Funds curve is taken as an input. The inputs may be selected as a USD federal funds curve, and/or a USD/BRL NDF: spot, 1 week, 1-3 month, 6 month, 9 month, 1-5 year, 7 year, and/or 10 year.

A BRL forecast curve may be generated by the API. Since DI futures are single cash flow instruments, BRL forecast curves may be built the same with or without the discount curve. The difference comes when pricing a BRL offshore trade with single or dual curves. Inputs may include CDI 1 day rate, DI futures rates adjusted by on-and-offshore spreads.

In some cases, a bootstrap generator for BRL forecast curve to ensure all DI future inputs are priced at par. In the curve generation process, due to concerns regarding compounding, a log linear interpolator on discount factor is selected. For the discount curve, global generator and log spline interpolator on discount factor are used to ensure both par-pricing and curve smoothness.

Figure 2:
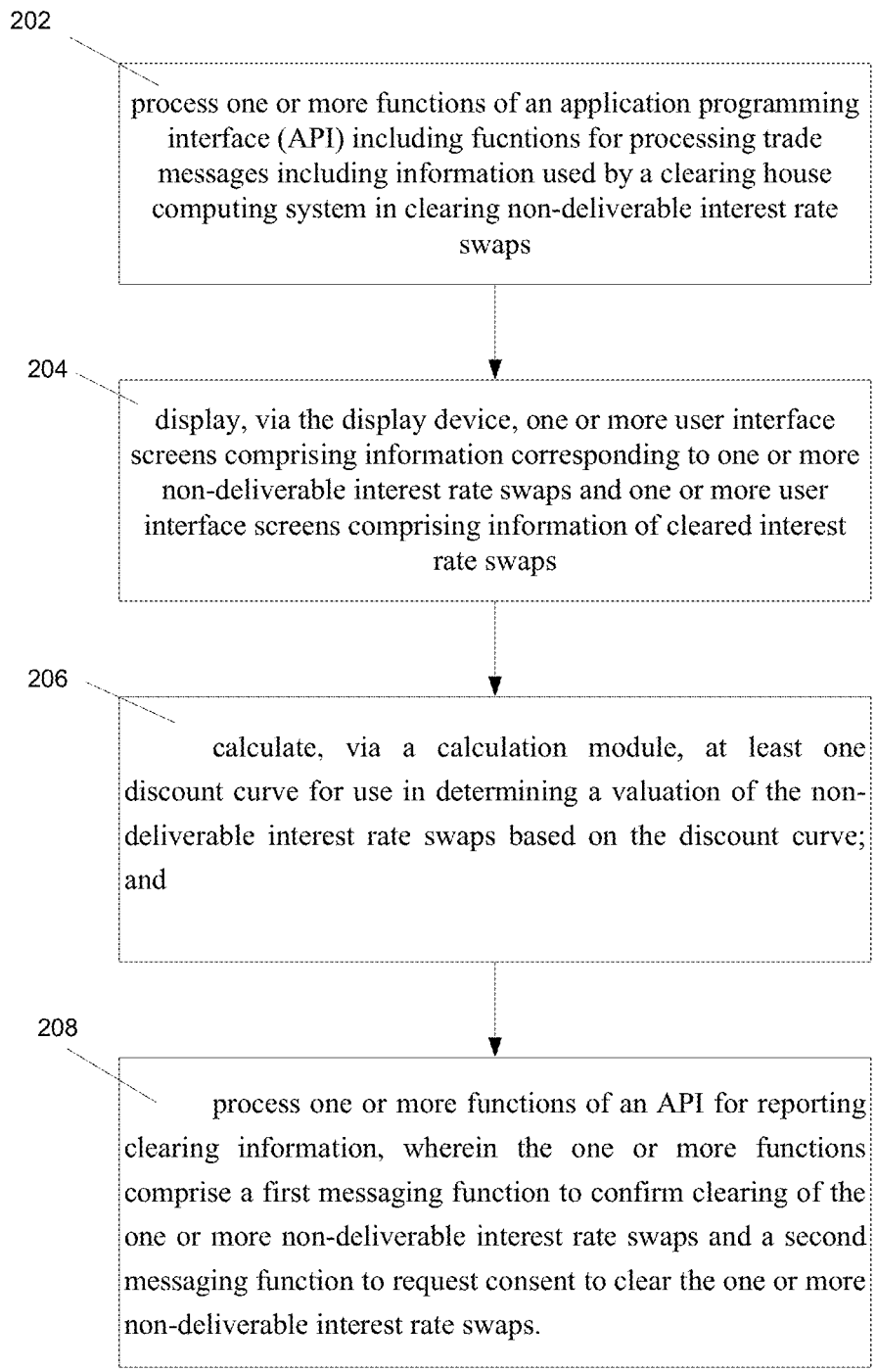
FIG. 2 shows an illustrative block diagram of a method for providing a clearing framework for clearing non-deliverable interest rate swap products according to aspects of the present disclosure.

FIG. 2 shows an illustrative block diagram of a method for providing a clearing framework for clearing non-deliverable interest rate swap products according to aspects of the present disclosure. At 202, a clearing network computing system may process one or more API functions to process trade messages including information used by a clearing house computing system to clear non-deliverable interest rate swaps. As such, the efficiency and reliability of the clearing network computing system is increased as the API allows processing to be performed locally and does not involve access to a remote computing system located in a country associated with a non-deliverable currency involved in the swap, thus eliminating downtime due to remote system failures. As such, the clearing system can maintain a higher level of security as all calculations may be performed based on information managed within the clearing network.

At 204, the clearing network computing system may display via a display device, one or more user interface screens comprising information corresponding to one or more non-deliverable interest rate swaps and one or more user interface screens comprising information of cleared interest rate swaps. At 206, the clearing network computing system may display at least one discount curve for use in determining a valuation of the non-deliverable interest rate swaps based on the discount curve. The clearing network computing system may build one or more curves based on a curve building methodology for cleared interest rate swaps including a non-deliverable currency. At 208, the clearing network computing system may process one or more functions of the API for reporting clearing information, wherein the one or more functions may comprise a first messaging function to confirm clearing of the one or more non-deliverable interest rate swaps and a second messaging function to request consent to clear the one or more non-deliverable interest rate swaps. The messaging functions may be formatted in one or more of a plurality of messaging formats including FIXML and FpML.

The present invention has been described in terms of preferred and exemplary embodiments thereof. Numerous other embodiments, modifications and variations within the scope and spirit of the invention will occur to persons of ordinary skill in the art from a review of this disclosure. For example, aspects of the invention may be used to process and communicate data other than market data.

We claim:

1. A system providing a clearing framework for clearing a non-deliverable interest rate swap, the system comprising:
   a display device;
   a non-transitory memory device;
   a processor communicatively coupled to the display and the non-transitory device, wherein the non-transitory memory device stores instructions, that when executed by the processor, cause the system to:
   process one or more functions of an application programming interface (API) including functions for processing trade messages including information used by a clearing house computing system in clearing non-deliverable interest rate swaps;
   display, via the display device, one or more user interface screens comprising information corresponding to one or more non-deliverable interest rate swaps and one or more user interface screens comprising information of cleared interest rate swaps;
   calculate, via a calculation module, at least one discount curve for use in determining a valuation of the non-deliverable interest rate swaps based on the discount curve; and process one or more functions of the API for reporting clearing information, wherein the one or more functions comprises a messaging function to confirm clearing of the one or more non-deliverable interest rate swaps and a second messaging function to request consent to clear the one or more non-deliverable interest rate swaps.

2. The system of claim 1, wherein the API comprises a messaging function comprising a trade submission message for use at a trade input terminal to communicate a trade submission to the clearing framework, wherein the trade submission message includes a plurality of attributes corresponding to deliverable and non-deliverable currencies associated with the non-deliverable interest rate swaps.

3. The system of claim 2, wherein the trade submission message is configured in a financial communication messaging format.

4. The system of claim 1, wherein the API comprises at least one interface function to facilitate communicate using a financial information exchange messaging language (FIXML).

5. The system of claim 1, wherein the API comprises at least one interface function to facilitate communicate using a financial products markup language (FpML) message format.

6. The system of claim 1, wherein at least one user interface screen comprises a position management system interface screen to communicate a visual representation of at least one swap, wherein the position management system interface comprises a tabular format, wherein a first row displays information corresponding to a swap and includes a first row corresponding to characteristics of the swap.

7. The system of claim 6, wherein the first row is expandable to show a second row associated with a first leg of the swap and a third row associated with a second leg of the swap, wherein the second row and the third row includes columns associated with at least one characteristic of the swap.

8. The system of claim 1, wherein the API comprises at least one function corresponding to a clearing firm settlement provision, wherein the API comprises a financial products markup language (FpML) element included at a leg-level of each swap clearing confirmed message generated through the API and a request consent message generated through the API.

9. The system of claim 8, wherein the settlement provision may be represented in a fixing schedule format of a FpML message or a fixing date format of the FpML message.

* * * * *